US006603978B1

United States Patent
Carlsson et al.

(10) Patent No.: US 6,603,978 B1
(45) Date of Patent: Aug. 5, 2003

(54) ACCURATE GPS TIME ESTIMATE BASED ON INFORMATION FROM A WIRELESS COMMUNICATIONS SYSTEM

(75) Inventors: Hans Carlsson, Cary, NC (US); Havish Koorapaty, Cary, NC (US); Leland Scott Bloebaum, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/534,787

(22) Filed: Mar. 24, 2000

(51) Int. Cl.$^7$ ............................................... H04B 15/00
(52) U.S. Cl. ........................ 455/502; 455/515; 455/456
(58) Field of Search ................................ 455/456, 502, 455/403, 500, 450, 434, 437, 516, 62, 455, 464, 515; 370/324, 357, 503, 321, 328, 347, 350; 375/356, 344, 366, 354, 362, 358; 342/357.09, 357.03, 357.12; 343/112 R, 357

(56) References Cited

U.S. PATENT DOCUMENTS

| | | | | |
|---|---|---|---|---|
| 3,705,404 A | * | 12/1972 | Chisholm ............... | 343/112 R |
| 4,445,118 A | * | 4/1984 | Taylor et al. ............... | 343/357 |
| 5,604,744 A | * | 2/1997 | Andersson et al. ......... | 370/347 |
| 5,625,668 A | | 4/1997 | Loomis et al. | |
| 5,809,421 A | * | 9/1998 | Manssen et al. ............ | 455/434 |
| 5,812,087 A | * | 9/1998 | Krasner ...................... | 342/357 |
| 5,828,659 A | * | 10/1998 | Teder et al. ................ | 370/328 |
| 5,945,944 A | * | 8/1999 | Krasner ................. | 342/357.06 |
| 6,011,974 A | * | 1/2000 | Cedervall et al. ........... | 455/456 |
| 6,023,477 A | * | 2/2000 | Dent .......................... | 370/509 |
| 6,067,045 A | * | 5/2000 | Castelloe et al. ...... | 342/357.09 |
| 6,249,245 B1 | * | 6/2001 | Watters et al. ......... | 342/357.03 |
| 6,300,899 B1 | * | 10/2001 | King ...................... | 342/357.12 |
| 6,438,376 B1 | * | 8/2002 | Elliott et al. ................ | 455/437 |

FOREIGN PATENT DOCUMENTS

| WO | WO 00/10028 | 2/2000 |
|---|---|---|
| WO | WO 00/10031 | 2/2000 |

* cited by examiner

*Primary Examiner*—Edward F. Urban
*Assistant Examiner*—C. Chow
(74) *Attorney, Agent, or Firm*—Coats & Bennett, P.L.L.C.

(57) ABSTRACT

A method and apparatus for acquiring timing signals for use in a positioning receiver using timing assistance provided by a wireless communications system, such as cellular telephone system. A mobile terminal equipped with a positioning receiver operates in a wireless communications system having control channels and at least one traffic channel unsynchronized to the control channels. The mobile terminal camps on a first control channel in a first cell having a first time base associated therewith. While camped on the control channel, the mobile terminal establishes a local clock reference, internal to the mobile terminal, capable of tracking the first time base. The mobile terminal then operates on a first traffic channel that is unsynchronized to the first control channel and notes the difference in time bases between the control channel and the traffic channel. Either while camped on the control channel or while operating on the traffic channel, the mobile terminal receives TDMA-to-GPS relationship data, which is a measure of the offset between system time for the wireless communications system as expressed on particular control channel ("TDMA time") and the system time for the GPS system ("GPS time"). Thereafter, an accurate estimate of the GPS time is calculated in the mobile terminal based on the local clock reference and the TDMA-to-GPS relationship data. In some aspects, the local clock reference is updated based on the first traffic channel so as to minimize errors arising from timing drift.

42 Claims, 5 Drawing Sheets

ACCURATE GPS TIME ESTIMATE BASED ON INFORMATION FROM A WIRELESS COMMUNICATIONS SYSTEM

BACKGROUND OF THE INVENTION

The present invention relates to the field of global positioning, and more particularly to an apparatus and method of deriving a GPS time estimate from information supplied by a wireless communications system for use by a positioning system receiver associated with a wireless communications mobile terminal, such as a cellular phone, so as to improve at least time-to-first-fix and signal sensitivity.

Satellite positioning receivers normally determine their position by computing relative times of arrival of signals transmitted simultaneously from a multiplicity of satellites such as the U.S. Global Positioning System (GPS) or NAVSTAR satellites. For example, the GPS Orbital Constellation consists of 28 satellites which orbit the earth in 12 hour orbits. The satellites are arranged in six orbital planes each containing four or more satellites. The orbital planes are spaced 60° apart from each other and are inclined approximately 55° with respect to the equatorial plane. This constellation provides a user with approximately four to twelve satellites visible from any point on earth. These satellites transmit, as part of their message, both satellite positioning data, so-called "ephemeris" data, as well as clock timing data. In addition, the satellites transmit time-of-week (TOW) information associated with the satellite signal, which allows the receiver to unambiguously determine time. The process of searching for and acquiring GPS signals, reading the ephemeris and other data for a multiplicity of satellites, and then computing the location of the receiver (and accurate time-of day) from this data is time consuming, often requiring several minutes. In many applications, this lengthy processing time introduces unacceptable delays, and furthermore, greatly limits battery life in portable applications.

In addition, in many situations there may be blockage of the satellite signals. In these cases, the received signal level from the GPS satellites can be too low to demodulate and derive the satellite data signals without error. Such situations may arise in personal tracking and other highly mobile applications. In these situations, it may not be possible for a GPS receiver to acquire and track the GPS signals without first having a very good estimate of the actual GPS time.

Despite the difficulties associated with GPS positioning, it is becoming increasingly common to incorporate a GPS receiver into a wireless communications mobile terminal. This combination may be advantageously leveraged to provide assistance to the GPS receiver in determining time with the assistance of time information supplied by the wireless communications system. Such an arrangement is discussed in U.S. Pat. No. 5,945,944 to Krasner which discusses the idea in the context of a variety of wireless communications systems, including Time Division Multiple Access (TDMA) networks operating according to the standard known as Global System for Mobile Communications (GSM). The Krasner approach, however, may not function adequately when the mobile terminal is engaged in a call on a traffic channel, particularly when the traffic channel does not contain a firm reference to GPS time and when the traffic channel is not necessarily synchronized to the last used control channel.

Thus, there remains a need for an apparatus and method of providing time information assistance to a GPS receiver via a wireless communications system mobile terminal during active call sessions in a system where traffic channels are not necessarily synchronized to control channels.

SUMMARY OF THE INVENTION

The present invention meets this and other needs by providing a method and apparatus for acquiring timing signals for use in a positioning receiver based on timing assistance provided by a wireless communications system, such as cellular telephone system. In particular, this invention provides an accurate GPS time estimate based on a relationship between GPS time-of-week (TOW) and a particular point in the long-term cycle of transmissions from the mobile wireless communications network with which the GPS-equipped mobile terminal communicates. This relationship is provided to the mobile terminal as aiding information ("assistance") from the radio network, perhaps accompanied by other assistance representative of satellite locations, etc.

In an illustrative example, the mobile terminal operates in a wireless communications system having control channels and at least one traffic channel unsynchronized to the control channels. The mobile terminal operates in an idle (non-call) state on a first control channel in a first cell having a first time base associated therewith. While receiving the control channel, the mobile terminal establishes a local clock reference, internal to the mobile terminal, capable of deriving the first time base. The mobile terminal then operates on a first traffic channel that is unsynchronized to the first control channel and notes the difference in time bases between the control channel and the traffic channel. If the mobile terminal then moves to another traffic channel, the mobile terminal preferably also notes the difference in time bases between the traffic channels, so as to relate the time base of the present traffic channel to the time base of the control channel. Either while receiving the control channel in idle state or while operating on the traffic channel, the mobile terminal receives TDMA-to-GPS reference data, which indicates the relationship between system time for the wireless communications system as expressed on particular control channel ("TDMA time") and the system time for the GPS system ("GPS time"). For instance, the TDMA-to-GPS reference data may say that at particular point A in the TDMA time base, the corresponding GPS time was B. Thereafter, an accurate estimate of the GPS time is calculated based on the local clock reference and the TDMA-to-GPS relationship data. In some preferred aspects, the local clock reference is updated based on the first traffic channel so as to combat drift.

DETAILED DESCRIPTION OF THE INVENTION

The present invention may be most advantageously employed in wireless communications systems 10, such as cellular telephone systems, having control channels and traffic channels that may be unsynchronized with respect to the control channels. The term "unsynchronized," as used herein means that the respective channels are not required to have frame boundaries that coincide in time. However, for the present invention, the two channels should have a known fixed relationship between the time period increments common to both channels. For instance, channel A may have a symbol rate that is known to be 1½ times the symbol rate of channel B (disregarding unintentional drift caused by clock variances). Of course, the present invention is simpler to implement if the two unsynchronized channels have the same symbol rates, but such is not strictly required. Further, two channels that are unsynchronized may, and for the present invention should preferably have, the same (or very similar) frame periods. Under such circumstances, a control channel and a traffic channel that is unsynchronized with respect to that control channel will have a fixed relationship between their respective start of frames, although their start of frames will not be aligned. As is well known to those of ordinary skill in the art, systems operating according to the standard known as TIA/EIA-136 have such a control channel to traffic channel relationship. As such, a TIA/EIA-136 compatible system will be used for illustrative purposes herein, but is should be understood that the present invention is not to be limited thereby.

Figure 1:
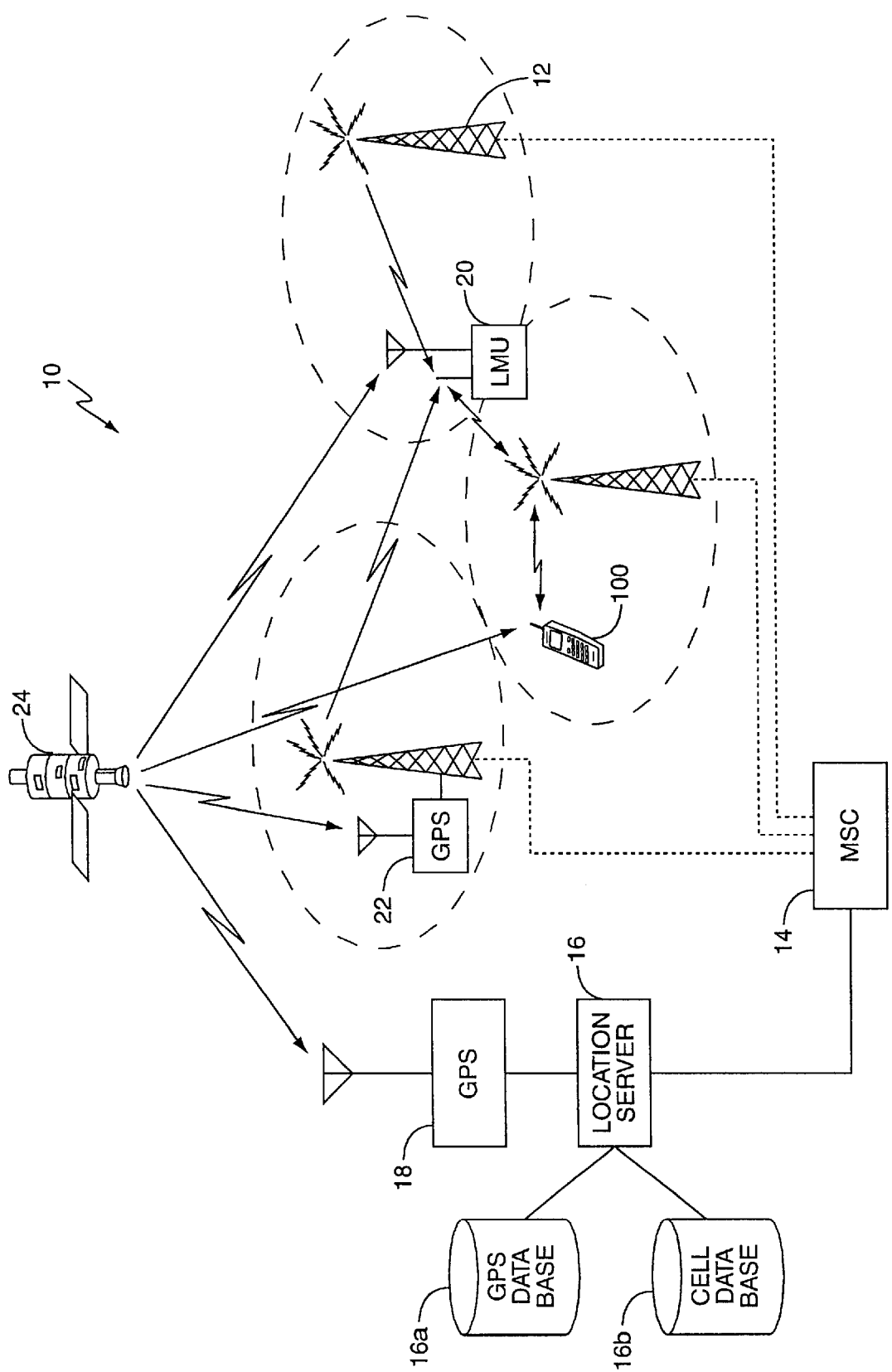
FIG. 1 shows a wireless communications system adapted for use according to the present invention.

FIG. 1 shows one typical arrangement of a wireless communications system, generally indicated by the numeral 10, suitable for the present invention. The wireless communications system 10 includes a plurality of base stations 12 which are connected to one or more mobile services switching centers (MSC) 14. Each base station 12 is located in, and provides service to, a geographic region referred to as a cell. In general, there is one base station 12 for each cell or sector within a given network 10. Within each cell, there may be a plurality of mobile terminals 100 that communicate via radio link with the base station 12 in a manner well known in the art. The base station 12 allows the user of the mobile terminal 100 to communicate with other mobile terminals 100, or with users connected to the Public Switched Telephone Network. The MSC 14 routes calls to and from the mobile terminal 100 through the appropriate base station 12. Information concerning the location and activity status of mobile terminals 100 is stored in a Home Location Register (not shown) and a Visitor Location Register (not shown), which may be incorporated into, or otherwise communicate with, the MSCs 14.

Communicating with the MSC 14 is a location server 16 which preferably includes a GPS database 16a and a cell database 16b. The GPS database 16a contains, for example, up-to-date satellite information such as ephemeris and almanac, while the cell database 16b contains information about the location of the cells in the geographic area served by the location server 16. The location server 16 also preferably communicates with a fixed GPS receiver, referred to herein as a GPS station 18. One function of the GPS station 18 is to monitor the "universal" time of a Global Positioning System based on GPS signals from a plurality of GPS satellites 24 (only one shown for clarity). While the methods and apparatus of the present invention are described below with reference to GPS satellites 24, it will be appreciated that the teachings are equally applicable to positioning systems which utilize pseudolites or a combination of satellites 24 and pseudolites. Pseudolites are ground based transmitters which broadcast a signal similar to a traditional satellite-sourced GPS signal modulated on an L-band carrier signal, generally synchronized with GPS time. Pseudolites are useful in situations where GPS signals from an orbiting satellite 24 might by unavailable, such as tunnels, mines, buildings or other enclosed areas. The term "satellite", as used herein, is intended to include pseudolites or equivalents of pseudolites, and the term GPS signals, as used herein, is intended to include GPS-like signals from pseudolites or equivalents of pseudolites. Also, while the following discussion is with reference to application upon the United States Global Positioning Satellite (GPS) system, these methods are equally applicable to similar satellite positioning systems, such as the Russian Glonass system. The term "GPS" used herein includes such alternative satellite positioning systems, including the Russian Glonass system. Thus, the term "GPS signals" includes signals from such alternative satellite positioning systems.

In addition to the mobile terminals 100 dispersed throughout the wireless communications system 10, there may be a plurality of location measurement units (LMU) 20. An LMU 20 is essentially a GPS enabled mobile terminal 100 deployed in the network 10 expressly for the purpose of measuring the timing relationship between GPS time and one or more channels of the wireless communications system 10. Alternatively, there may be GPS units 22 at each base station 12, or some combination of LMU 20 and base station GPS units 22.

Figure 2:
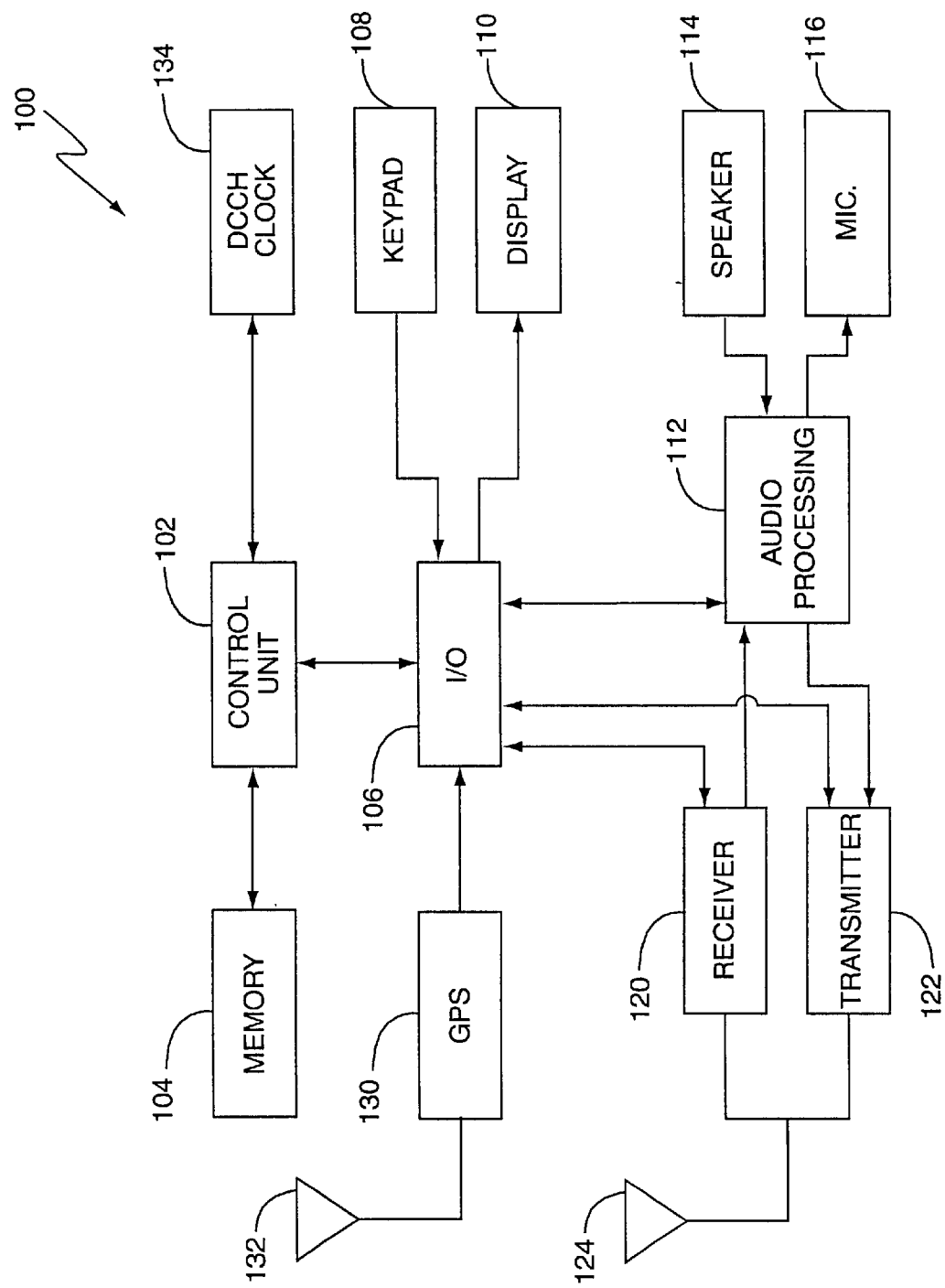
FIG. 2 shows a wireless communications mobile terminal having a positioning receiver adapted for use according to the present invention.

The present invention assumes that there is a GPS receiver included with, or otherwise associated with, the mobile terminal 100. FIG. 2 shows one aspect of a mobile terminal 100 that includes a GPS receiver 130 that is capable of determining position from information received from the GPS signals. The mobile terminal 100 of FIG. 2 is a fully functional cellular telephone, such as a TIA/EIA-136 compliant cellular telephone, capable of transmitting and receiving signals. The mobile terminal 100 includes a main control unit 102 for controlling the operation of the mobile terminal 100 and memory 104 that may store control programs and data used by the mobile terminal 100 during operation, including during position fixes. Input/output circuits 106 interface the main control unit 102 with keypad 108, display 110, audio processing circuits 112, receiver 120, transmitter 122, positioning receiver 130, and DCCH clock 134. The keypad 108 allows the operator to dial numbers, enter commands, and select options. The display 110 allows the operator to see dialed digits, stored information, and call status information. The audio processing circuits 112 provide basic analog audio outputs to a speaker 114 and accept analog audio inputs from a microphone 116. The receiver 120 and transmitter 122 receive and transmit signals using shared antenna 124. The positioning or GPS receiver 130 enables the mobile terminal 100 to determine its current location based on GPS signals transmitted by a GPS satellite and received via antenna 132. While the GPS receiver 130 is shown as a separate component in FIG. 2, is should be understood that the controller 102 may function as a portion of the GPS receiver 130 in addition to its other functions. DCCH clock 134 functions to track time as expressed by a control channel of the wireless communications system 10, as discussed in greater detail below.

As described in U.S. Pat. No. 5,945,944, the disclosure of which is incorporated herein by reference, the time required for the GPS receiver 130 to acquire a first fix on location (time-to-first-fix) and signal sensitivity may both be improved if the GPS receiver 130 is provided with an accurate estimate of the current time as viewed by the GPS system.

In the present invention, a measure of the system time for the wireless communications system 10 as expressed on a particular control channel ("TDMA time") and the timing relationship between that TDMA time and the system time for the GPS system ("GPS time") is used by the mobile terminal 100 to derive an accurate estimate of the current GPS time. This TDMA-to-GPS time relationship typically reflects what GPS time, typically expressed in terms of GPS time-of-week (TOW), corresponds to a given point in the control channel radio transmissions for a certain control channel in a certain cell. Thus, the TDMA-to-GPS relationship data may indicate that TOW to occurred at frame $F_x$, time-slot $T_y$, and symbol $S_z$. In addition, some aspects of the present invention utilize another relationship, called the channel offset, to represent the timing relationship between two communications channels used by the wireless communications system 10. For instance, the timing of a traffic channel (DTC) may be such that the DTC frames start at a given frame/time-slot/symbol of a control channel (DCCH). The channel offset is used to represent this difference in phase. Of course, the channel offset may also be used to describe the timing relationship between traffic channels (e.g., $DTC_1$ to $DTC_2$). Preferably, both the TDMA-to-GPS relationship data and channel offset are expressed in the same terms so as to facilitate the summing thereof.

Both the TDMA-to-GPS relationship data and channel offsets may be measured by LMUs 20. For instance, a given LMU 20 may monitor both a particular DCCH and the GPS time and provide the measured relationship between the two to the location server 16 for storage and subsequent retrieval upon demand. This measurement is preferably performed on a periodic basis to maintain fresh data, but may be done on demand instead. If the TDMA-to-GPS relationship data is not measured by an LMU 20, the GPS time may be measured by the optional GPS units 22 co-located with the base stations 12 and the base stations 12 may compute the corresponding TDMA-to-GPS relationship data. The mobile terminal 100 is also capable of determining the channel offset between two channels, when changing between the two channels, as described further below.

Figure 4:
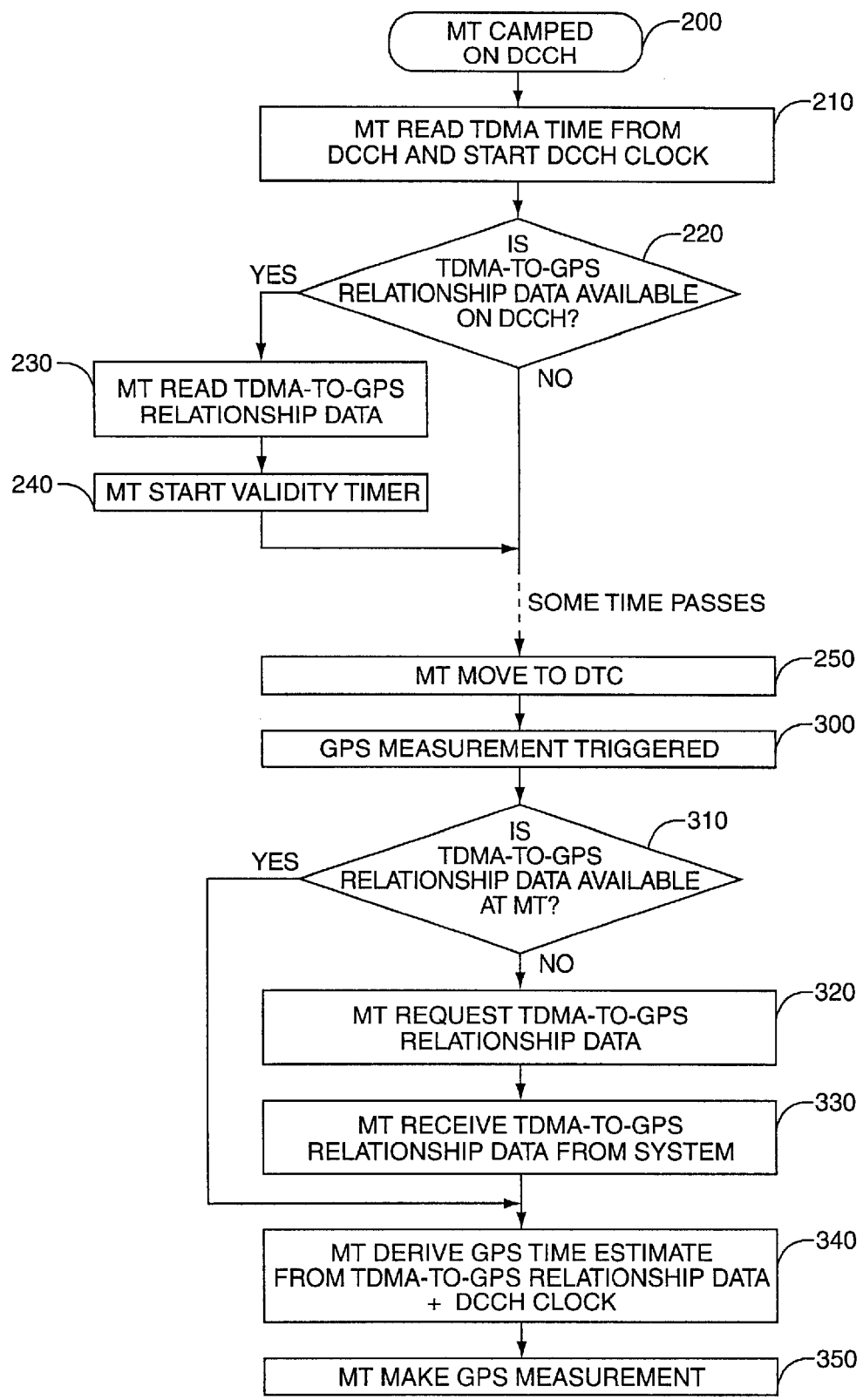
FIG. 4 is a flow chart showing the overall process flow of one aspect of the present invention.

Referring to FIG. 4, the process of the present invention begins with the mobile terminal 100 receiving or camped on a control channel belonging to a base station 12 associated with a cell (box 200). While camped, the mobile terminal 100 monitors the control channel to see if the TDMA-to-GPS relationship data for that control channel is being broadcast (box 220). For instance, the wireless communications system 10 may be broadcasting the TDMA-to-GPS relationship data as part of a layer 2 broadcast message on the control channel. If the TDMA-to-GPS relationship data is being broadcast, the mobile terminal 100 reads the TDMA-to-GPS relationship data from the control channel (box 230) and starts a validity timer (box 240). The purpose of the validity timer is to flag when the TDMA-to-GPS relationship data may be so old as to be unreliable, as described in more detail below. In addition to reading the TDMA-to-GPS relationship data from the control channel, the mobile terminal 100 may also receive other assistance information such as approximate location of the mobile terminal 100, visible satellites 24 at that approximate location, and information such as ephemeris and almanac describing the orbits of these satellites 24.

Whether or not the TDMA-to-GPS relationship data is broadcast on the control channel, the mobile terminal 100 reads the system time from the DCCH and starts an internal DCCH clock, sometimes referred to herein as a local reference clock (box.210). The purpose of the DCCH clock 134 is to track the passage of TDMA time on the control channel. The DCCH clock 134 may be implemented as a simple modulo counter based on a hyperframe. For instance, the DCCH clock 134 may count symbols received on the DCCH and increment itself for each symbol received. Preferably, the DCCH clock 134 tracks not only symbols, but also frames, multi-frames, superframes, and ultimately hyperframes. Thus, while the mobile terminal 100 is camped on the control channel (after box 210), the DCCH clock 134 is synchronized to the TDMA time base of the control channel. Preferably, the mobile terminal 100 also stores the channel identity of the control channel, such as the frequency identification and the corresponding cell/base station identity.

Figure 3:
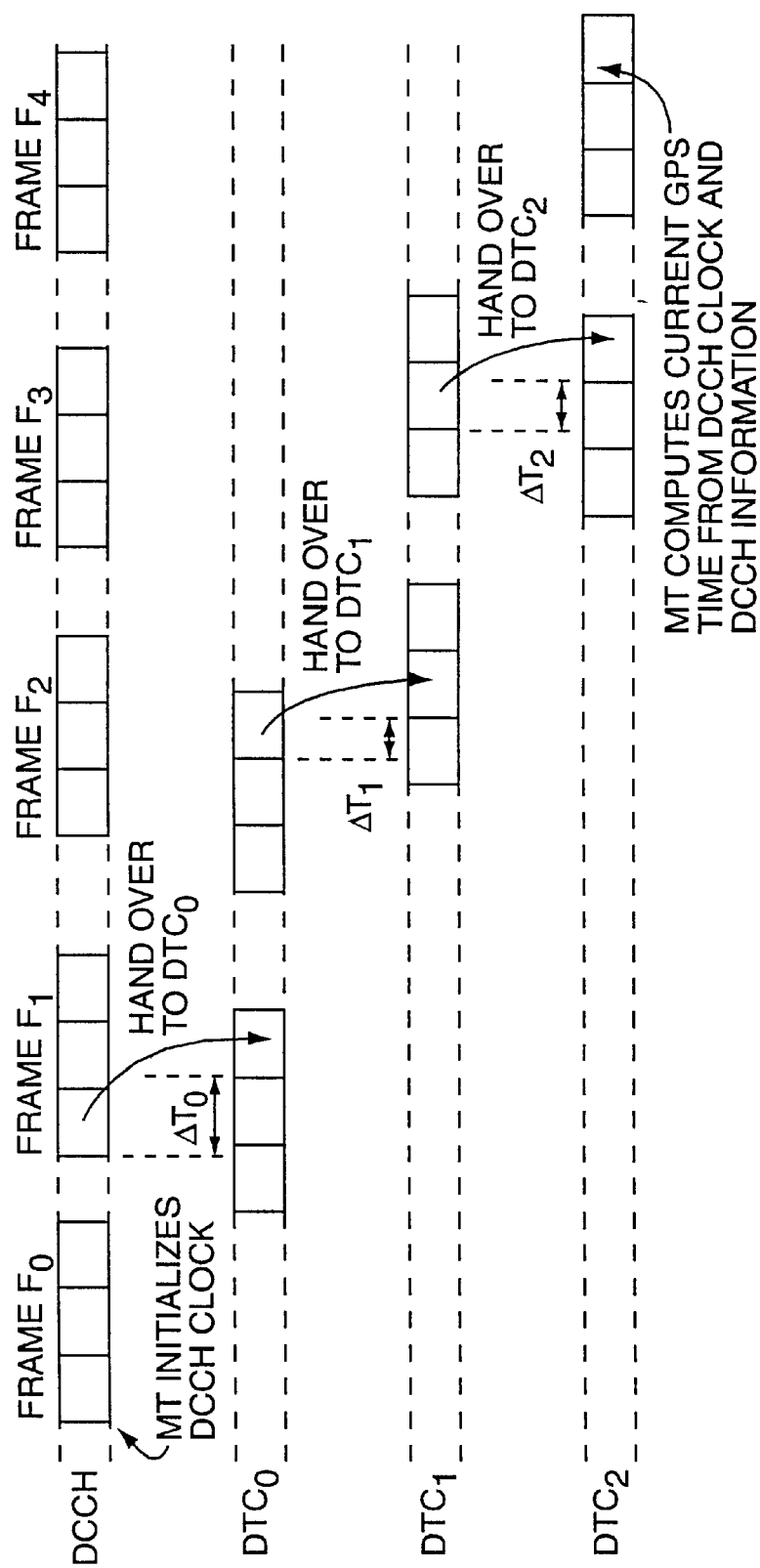
FIG. 3 shows possible timing relationships between various channels used by the wireless communications system of FIG. 1.

At some point, the mobile terminal 100 moves to a traffic channel (box 250), such as part of the process of making or receiving a call. As pointed out above, the traffic channel is assumed to not be synchronized to the control channel. As such, there should be a difference in a time shift in the frame boundaries between the traffic channel and the control channel. In FIG. 3, this channel offset is represented by $\Delta T_0$. Thus, when the mobile terminal 100 changes to the traffic channel (box 250), the mobile terminal 100 notes the offset in time $\Delta T_0$ (e.g., the difference in frame boundary as expressed in symbols) between the control channel and the traffic channel. This value is used to update the DCCH clock 134, such as by updating the appropriate counters.

Thereafter, the mobile terminal 100 may optionally change to another traffic channel while engaged in the same call session. For instance, the mobile terminal 100 may move from one cell to another, necessitating a handover, or the mobile terminal 100 may change traffic channel for any other reason known in the art. When the mobile terminal 100 makes such changes, the mobile terminal 100 notes the resulting difference in TDMA time as expressed by those traffic channels (e.g., $\Delta T_1$, $\Delta T_2$) and updates the DCCH clock 134 accordingly. Preferably, the mobile station's changes from one channel to another are handled in a consistent manner so that the channel offsets may be consistently measured and combined.

While engaged in the call, the mobile terminal 100 encounters a situation that requires a position fix (box 300). This may be the result of a command from the wireless communications system 10, or may be based on some program internal to the mobile terminal 100. In response, the mobile terminal 100 determines whether a valid TDMA-to-GPS relationship data is available to the mobile terminal 100 (box 310), such as a stored value from box 230. If the TDMA-to-GPS relationship data is not available (box 310), the mobile terminal 100 requests the information from the wireless communications system 10 (box 320). The request to the wireless communications system 10 should include the channel identification of the control channel that is referenced by the DCCH clock 134. The wireless communications system 10 processes the request and determines the appropriate value of TDMA-to-GPS relationship data that corresponds to the control channel identified by the mobile terminal's request (box 330). To get the TDMA-to-GPS relationship data value, the wireless communications system 10 may query the location server 16 for the appropriate data, or if necessary, the location server 16 and/or some other portion of the wireless communications system 10 may instruct the GPS unit 22 associated with the corresponding base station 12, or an appropriate LMU 20, to gather the information. If LMU 20s are used, their measurements should include information about the cell and channel number for which the TDMA-to-GPS relationship data relationship is valid to help insure that the correct information is utilized. Regardless of exactly how the information is gathered, the wireless communications system 10 then transmits the TDMA-to-GPS relationship data which is received by the mobile terminal 100 on the traffic channel (box 330). Just by way of example, the wireless communications system 10 may transmit the TDMA-to-GPS relationship data to the mobile terminal 100 as part of a point-to-point teleservices layer 3 message on the traffic channel. The mobile terminal 100 then determines an accurate time estimate of the GPS time based on the TDMA-to-GPS relationship data and the DCCH clock 134 (box 340), as described further below. This accurate estimate of the GPS time is then provided to the portion of the mobile terminal 100 performing the GPS calculations, such as the GPS receiver portion 130 of the mobile terminal 100, for use in making the position determination (box 350). Armed with the accurate time estimate, the GPS receiver 130 may substantially limit its search parameters, resulting in a shorter time-to-first fix and/or greater sensitivity.

Figure 5:
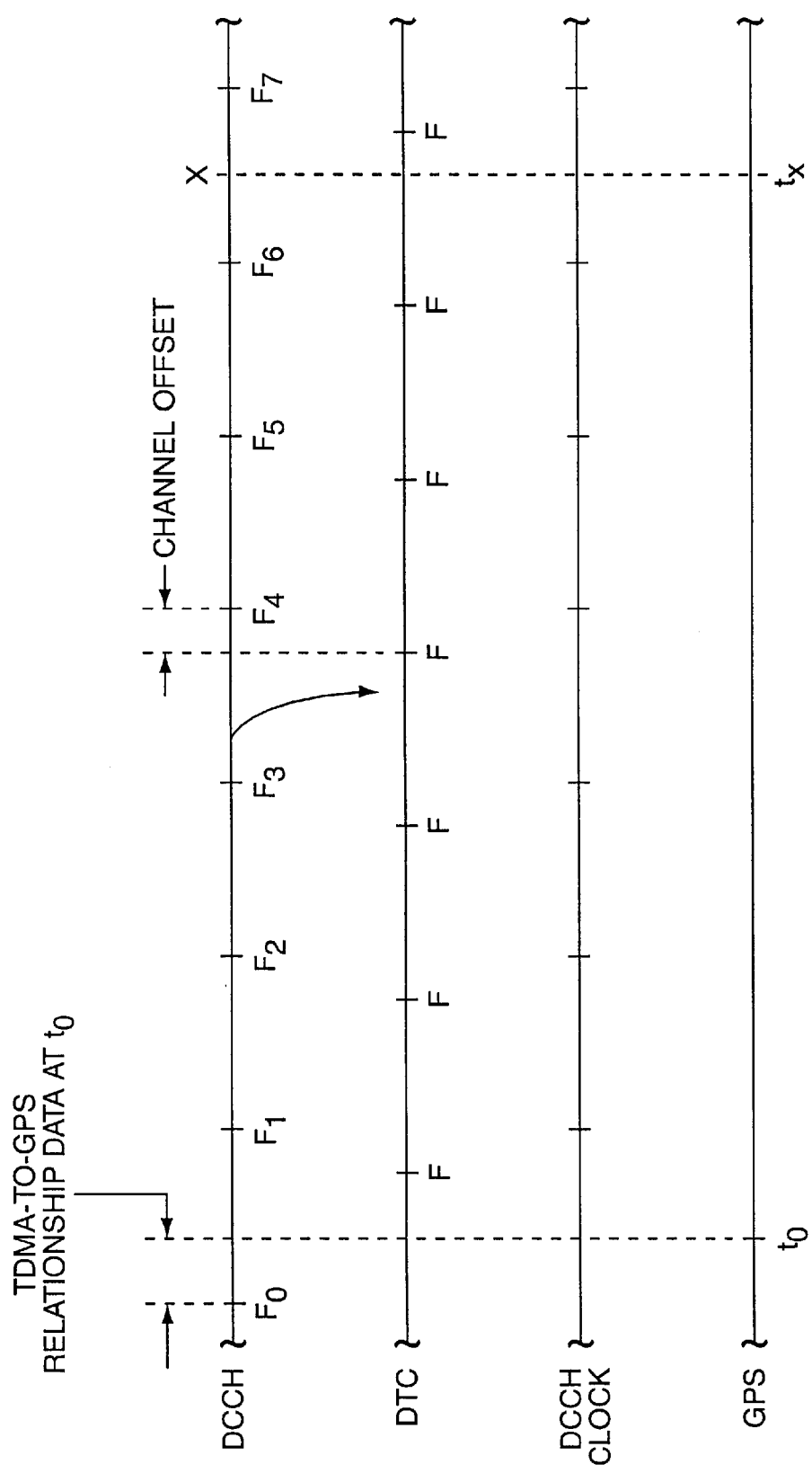
FIG. 5 shows possible timing relationships between the time bases of various channels used by the wireless communications system of FIG. 1.

Preferably, the estimate of GPS time is accurate within 10 $\mu$s. To get this accuracy, the mobile terminal 100 estimates the GPS time by, inter alia, determining the TDMA time of the control channel as tracked by the DCCH clock 134 and then adding the corresponding TDMA-to-GPS relationship data. This calculation process may be understood with reference to FIG. 5. In FIG. 5, the time base of the control channel is shown with periodic frame boundaries $F_0, F_1, F_2, F_3, \ldots$ The time base of the traffic channel is also shown having a series of periodic frame boundaries; however, because in TIA/EIA-136 systems 10 the traffic channels are not numbered, the frame boundaries on the traffic channel are each labeled F. For the conditions shown in FIG. 5, the control channel and the traffic channel have the same frame periods, but with the respective frame boundaries not in alignment, hence these two channels are unsynchronized. When the mobile terminal 100 camps on the control channel (box 200), sometime before $F_0$, the mobile terminal starts the DCCH clock 134, synchronized to the control channel (box 210). While the DCCH clock 134 does not have "frame boundaries" per se, the mobile terminal 100 can determine when frame boundaries correspondingly occur on the control channel; thus, the tick marks on the DCCH clock time line correspond to the time when the mobile terminal "expects" the frame boundaries on the control channel.

Regarding the present example, it should be noted that in TIA/EIA-136 networks 10, TDMA time may be expressed in terms of Extended Hyperframe Counter (EHC), Hyperframe Counter (HC), Primary/Secondary Superframe (PSS), Superframe Phase (SP), Timeslot Number (TN), and Symbol Number (SN). Values for the EHC, HC, PSS, and SP parameters are provided on the control channel transmissions, which the mobile terminal 100 monitors while in idle mode (i.e., powered on but not engaged in a call). In contrast, when a mobile terminal 100 is engaged in a call on a traffic channel, the mobile terminal 100 does not have access to the EHC, HC, PSS, and SP values for its current cell because the operational requirements for transmitting and receiving on the traffic channel in full rate mode eliminate the possibility for the mobile terminal 100 to simultaneously listen to control channel transmissions. Thus, the DCCH clock 134 is used to track TDMA time on the control channel while the mobile terminal is operating on the traffic channel.

Preferably, the mobile terminal 100 is provided with the GPS time index corresponding to an identified TDMA time index (for the relevant control channel) reasonably close in time to $t_x$ so as be able to easily calculate the GPS time at time $t_x$, as described further below.

In this example, the mobile terminal moves to a traffic channel (box 250) sometime between $F_3$ and $F_4$. It should be remembered that, in TIA/EIA-136 systems 10, the symbol rate on the traffic channel matches the symbol rate on the control channel, even though the frames are not necessarily aligned. Thus, the mobile terminal 100 may use the incoming symbols on the traffic channel to "clock" the DCCH clock 134. Because there are a known number of symbols per frame on the DCCH, a known number of frames per hyperframe, etc., the DCCH clock 134 is thus able to track the progression of TDMA time on the control channel based on the traffic channel signals.

Still with reference to FIG. 5, remember that the mobile terminal 100 is at some point (box 230 or box 330) provided with the TDMA-to-GPS relationship data. For purposes of illustration, assume that the TDMA-to-GPS relationship data is provided at box 230. This value corresponds to the TDMA-to-GPS relationship data at GPS time to. At point X, while the mobile terminal 100 is operating on a traffic channel, a GPS measurement is to be taken. The mobile terminal 100 may then calculate the GPS time estimate for point X ($t_x$) by simply starting with known GPS time at $t_0$, subtracting the TDMA-to-GPS relationship data, and adding the elapsed time on the control channel between the start of $F_0$ and point X, as measured by the DCCH clock 134.

In the discussion above, the DCCH clock 134 is used to help derive TDMA time (as expressed on the corresponding control channel). According to the description, the DCCH clock 134 is updated each time the mobile terminal 100 changes channels (e.g., box 250). Assuming that the DCCH clock 134 is implemented as a counter, this "updating" may be accomplished by changing the internal values of the counter. However, the affect of these changes must be tracked so that the DCCH clock may properly derive the TDMA time on the control channel. For example, the DCCH clock 134 may be updated according to the frame boundaries of the traffic channel, but the channel offset between the control channel and the current traffic channel will then need to be stored. For instance, the channel offset may indicate that the control channel frame boundary F5 occurs two timeslots and five symbols after the next traffic channel frame. Thus, the DCCH clock 134 may track the TDMA time on the control channel even if its internal counters are not aligned therewith.

In some aspects of the present invention, the DCCH clock 134 is maintained, when the mobile terminal 100 is on a traffic channel, by looking at the traffic channel. In general the timing sources (e.g., oscillators) in mobile terminals 100 are not as accurate, and are therefore drift more readily, than timing sources in base stations 12. As such, the present method leverages off the time base of the traffic channels to "clock" the DCCH clock 134, thereby reducing the amount of drift of the DCCH clock 134. The benefits of this approach may be seen by remembering that in box 310 of FIG. 4, the mobile terminal 100 examines whether there is a valid TDMA-to-GPS relationship data. The validity of the TDMA-to-GPS relationship data is indicated by the validity timer. If the validity timer has expired, then the TDMA-to-GPS relationship data likely contains too much error (accumulated drift) and therefore assumed to be invalid. If the traffic channel is used to help maintain the DCCH clock 134, then the starting value of the validity timer may be increased to reflect the greater validity period of the TDMA-to-GPS relationship data because the drift of DCCH clock 134 is lessened by relying on the traffic channel.

While a fixed value validity timer may be used to note the invalidity of a previously supplied TDMA-to-GPS relationship data, other approaches may also be used. For instance, there may be provisions for providing clock correction parameters to the mobile terminal 100 so as to allow the mobile terminal 100 to model the drift of the respective time bases. Some discussion of clock correction parameters may be found in U.S. patent application Ser. No. 09/066,956 by Camp, filed Apr. 28, 1998, which is incorporated herein by reference. If suitable clock correction parameters (e.g., the drift rate of the base station clock for the control channel) are provided to the mobile terminal 100 for the base station clock for the DCCH, the mobile terminal 100 can model the timing drift of the TDMA time of a DCCH with respect to the GPS time while it is camped on the DCCH. This would enable a mobile terminal 100 to use the TDMA-to-GPS relationship data for a much longer period of time, i.e., the validity period would increase when camping on a DCCH. Also, if the mobile terminal 100 is provided with similar clock correction parameters for the DTC to which the mobile terminal 100 is assigned, the mobile terminal 100 can apply the clock corrections for both the DTC and the DCCH whose TDMA time it is using in order to obtain an accurate TDMA-to-GPS relationship data for a much longer period of time. With this optional enhancement, if a handoff to a new DTC occurs, the mobile terminal 100 can be supplied with the clock correction parameters of the new DTC in order to ensure a long time of validity on the new DTC. In short, by increasing the period of validity for the TDMA time, through the supply of suitable clock correction parameters, the validity of the TDMA-to-GPS relationship data value supplied to the mobile terminal 100 may be increased considerably. Such an approach may be particularly useful when a positioning request originates during a long call where the TDMA time recorded (without clock corrections) by the mobile terminal 100 may have drifted. It should be noted that the same unit that measures the instantaneous TDMA-to-GPS relationship data for a control channel may measure the traffic channel clock correction. That is, if GPS time is available at the base station 12 via a fixed GPS units 22, the clock corrections may be measured at the base station 12, or if LMUs 20 are used to measure GPS time and TDMA time, then LMUs 20 also may be used to measure clock correction parameters for the traffic channels. It is believed that having GPS units 22 at the base stations 12 is a more efficient solution than using LMUs 20 if clock correction parameters are to be measured for all traffic channels.

However, the presence of LMUs 20 may be advantageous in some situations. For instance, instead of modeling the drift between the time bases, the mobile terminal 100 may instead be supplied with very recently measured offset values instead. For instance, when a position request is made when the user is on a call and the validity period of the currently available TDMA time has expired, the mobile terminal 100 requests an update of the TDMA time from the wireless communications system 10 (box 320). The system then commands an LMU 20 to measure the offset between the frame boundaries of the DTC that the mobile terminal 100 is on and the DCCH that the mobile terminal 100 was camped on earlier. It should be noted that this offset, which may be recorded as symbol number and time slot number, is conceptually the same parameter as the one that was recorded by the mobile terminal 100 when it was initially assigned the DTC. However, the particular value of this channel offset may have changed due to timing drifts on the DCCH and the DTC. The use of LMUs.20 may be particularly useful when the DCCH is transmitted by a first base station 12 and the DTC is transmitted by another base station 12. The LMU 20 also provides the new TDMA-to-GPS relationship data relationship. The new TDMA time and the TDMA-to-GPS relationship data allow the mobile station to adjust the error in its TDMA time due to the cumulative timing drift of the DCCH and the DTC. Thus, the mobile terminal 100 may have access to updated TDMA time even when it is on the DTC and can make accurate positioning measurements.

For certain situations, such as an emergency call, the wireless communications system 10 may unilaterally send the mobile terminal 100 the TDMA-to-GPS relationship data relationship as soon as emergency call is detected. In the case of an emergency call, the wireless communications system 10 already knows that the mobile terminal 100 will require positioning information and hence does not have to wait for a request from the mobile terminal 100. The wireless communications system 10 may, in the interests of speed, presume that the mobile terminal 100 does not have a valid TDMA-to-GPS relationship data relationship. In such cases, the cell identity and channel number of the control channel on which the mobile terminal 100 was last camped on may be sent to positioning server 16 by the MSC 14. The positioning server 16 then supplies the latest information on that channel and the information is forwarded to the mobile terminal 100. This situation is an example where the timing assistance information is made available to the mobile terminal 100 as soon as it moves to the DTC when it is known a priori that the information is required. The mobile terminal 100 can then begin accurate measurements sooner.

While the discussion above has used a EIA/TIA-136 compliant cellular telephone as an illustrative example of a wireless communications mobile terminal 100 for clarity, the present invention is not so limited. Indeed, it is to be understood that other wireless communications mobile terminals 100, such as personal communications assistants, pagers, and the like, are also within the scope of the present invention.

As should be readily apparent from the discussion above, the mobile terminal 100 should keep an internal clock, the DCCH clock 134, that tracks the progression of time on the last control channel that the mobile terminal 100 was operating on. This control channel is not necessarily the control channel that currently serves the cell in which the mobile terminal 100 is utilizing the traffic channel from. In fact, the mobile terminal 100 may have been engaged in a call for a long period of time prior to the positioning request, and may have participated in multiple handovers between traffic channels while crossing cell boundaries, as illustrated in FIG. 4.

The present invention may, of course, be carried out in other specific ways than those herein set forth without departing from the spirit and essential characteristics of the invention. The present aspects are, therefore, to be considered in all respects as illustrative and not restrictive, and all changes coming within the meaning and equivalency range of the appended claims are intended to be embraced therein.

What is aimed is:

1. In a mobile terminal having a GPS receiver and operating in a wireless communications system having control channels and at least one traffic channel unsynchronized to said control channels, a method of providing an accurate GPS time estimate to said GPS receiver, comprising:

operating said mobile terminal on a first control channel in a first cell, said first control channel having a first time base;

establishing a local clock reference, internal to said mobile terminal, capable of tracking said first time base;

determining, remote from said mobile terminal, a TDMA-to-GPS relationship data representative of the relationship between GPS time and said first time base at a first time instant;

receiving, by said mobile terminal, said TDMA-to-GPS relationship data;

operating said mobile terminal on a first traffic channel, said first traffic channel unsynchronized to said first control channel, and while operating on said first traffic channel deriving a GPS time estimate for a second time instant based on said local clock reference and said TDMA-to-GPS relationship data.

2. The method of claim 1 wherein receiving, by said mobile terminal, said TDMA-to-GPS relationship data comprises receiving, by said mobile terminal, a message on said first control channel containing said TDMA-to-GPS relationship data.

3. The method of claim 2 further comprising updating said local clock reference based on said first traffic channel.

4. The method of claim 1 further comprising requesting, by said mobile terminal, said TDMA-to-GPS relationship data to be sent and wherein receiving, by said mobile terminal, said TDMA-to-GPS relationship data comprises receiving a message on said first traffic channel containing said TDMA-to-GPS relationship data.

5. The method of claim 4 further comprising updating said local clock reference based on said first traffic channel.

6. The method of claim 1 wherein determining, remote from said mobile terminal, a TDMA-to-GPS relationship data representative of the relationship between GPS time and said first time base at a first time instant comprises a remote station monitoring said first control channel and a plurality of GPS satellites.

7. The method of claim 6 wherein said remote station is located in said first cell.

8. The method of claim 1 further comprising determining a channel time offset representative of the timing difference between said first control channel and said first traffic channel and wherein deriving a GPS time estimate based on said local clock reference and said TDMA-to-GPS relationship data comprises deriving said GPS time estimate based on said local clock reference, said channel offset, and said TDMA-to-GPS relationship data.

9. The method of claim 1 further comprising between operating said mobile terminal on said first control channel and operating said mobile terminal on said first traffic channel, operating said mobile terminal on a second traffic channel, said second traffic channel unsynchronized to said first control channel, wherein said second traffic channel is associated with said first cell and said first traffic channel is associated with a second cell, and while operating on said second traffic channel, updating said local clock reference based on said second traffic channel.

10. The method of claim 9 further comprising determining a channel time offset representative of the timing difference between said first control channel and said second traffic channel and thereafter updating said channel time offset to reflect the timing difference between said first control channel and said first traffic channel and wherein said deriving a GPS time estimate based on said local clock reference and said TDMA-to-GPS relationship data comprises deriving a GPS time estimate based on said local clock reference, said channel offset, and said TDMA-to-GPS relationship data.

11. The method of claim 1 wherein said GPS time estimate is in GPS time-of-week format.

12. The method of claim 1 further comprising recording, by said mobile terminal, a channel identification associated with said first control channel and further comprising said mobile terminal requesting said TDMA-to-GPS relationship data via a message comprising said channel identification.

13. The method of claim 12 wherein requesting said TDMA-to-GPS relationship data via a message comprising said channel identification comprises said mobile terminal requesting said TDMA-to-GPS relationship data while operating on said first traffic channel.

14. The method of claim 1 further comprising determining a position of said mobile terminal using said GPS time estimate.

15. The method of claim 1 wherein receiving, by said mobile terminal, said TDMA-to-GPS relationship data comprises receiving a message on said first traffic channel containing said TDMA-to-GPS relationship data.

16. The method of claim 15 further comprising said mobile terminal initiating a call set-up and further comprising automatically transmitting, by said wireless communications system, said message containing said TDMA-to-GPS relationship data in response to said call set-up.

17. The method of claim 16 wherein said mobile terminal initiating a call set-up comprises said mobile terminal initiating an emergency call.

18. The method of claim 1 further comprising:

determining, remote from said mobile terminal, clock correction parameters indicative of the time drift between said first time base and GPS time; and supplying said clock correction parameters to said mobile terminal prior to said deriving a GPS time estimate based on said local clock reference and said TDMA-to-GPS relationship data;

and wherein deriving a GPS time estimate based on said local clock reference and said TDMA-to-GPS relationship data comprises deriving a GPS time estimate based on said local clock reference, said TDMA-to-GPS relationship data, and said clock correction parameters.

19. The method of claim 18 wherein said clock correction parameters comprise indications of drift rate between said first time base and GPS time.

20. The method of claim 19 wherein said clock correction parameters further comprise indications of the rate of change in the timing difference between said first control channel and said first traffic channel.

21. The method of claim 1 wherein said wireless communications system operates according to TIA/EIA-136 compatible protocols.

22. In a mobile terminal having a GPS receiver and operating in a wireless communications system, a method of providing accurate time information to said GPS receiver, comprising:

operating said mobile terminal on a first control channel in a first cell, said first control channel having a first time base;

operating said mobile terminal on a first traffic channel unsynchronized to said first control channel;

receiving, at said mobile terminal, a TDMA-to-GPS relationship data representing the timing relationship between GPS time and said first time base;

providing a time estimate to said GPS receiver while said mobile terminal is operating on said first traffic channel, said time estimate based on said first time base and said TDMA-to-GPS relationship data.

23. The method of claim 22 further comprising establishing a local clock reference, internal to said mobile terminal, capable of deriving said first time base and wherein providing a time estimate to said GPS receiver while said mobile terminal is operating on said traffic channel comprises generating a time estimate based on said local clock reference.

24. The method of claim 23 further comprising updating said local clock reference based on said first traffic channel.

25. The method of claim 22 wherein receiving, at said mobile terminal, said TDMA-to-GPS relationship data comprises receiving, by said mobile terminal, a message on said first control channel containing said TDMA-to-GPS relationship data.

26. The method of claim 22 further comprising requesting, by said mobile terminal, said TDMA-to-GPS relationship data to be sent and wherein receiving, at said mobile terminal, said TDMA-to-GPS relationship data comprises receiving a message on said first traffic channel containing said TDMA-to-GPS relationship data.

27. The method of claim 22 further comprising determining a channel time offset representative of the timing difference between said first control channel and said first traffic channel and wherein said time estimate is based on said first time base, said channel offset, and said TDMA-to-GPS relationship data.

28. The method of claim 23 further comprising between operating said mobile terminal on said first control channel and operating said mobile terminal on said first traffic channel, operating said mobile terminal on a second traffic channel, said second traffic channel unsynchronized to said first control channel, wherein said second traffic channel is associated with said first cell and said first traffic channel is associated with a second cell, and while operating on said second traffic channel, updating said local clock reference based on said second traffic channel.

29. The method of claim 22 further comprising recording, by said mobile terminal, a channel identification associated with said first control channel and further comprising said mobile terminal requesting said TDMA-to-GPS relationship data via a message comprising said channel identification while operating on said first traffic channel.

30. The method of claim 23 further comprising:
determining, remote from said mobile terminal, clock correction parameters indicative of the time drift between said first time base and GPS time; and
supplying said clock correction parameters to said mobile terminal prior to said providing a time estimate to said GPS receiver;
and wherein said GPS time estimate is based on said local clock reference, said TDMA-to-GPS relationship data, and said clock correction parameters.

31. In a mobile terminal having a GPS receiver and operating in a wireless communications system, a method of providing accurate time information to said GPS receiver, comprising:
operating said mobile terminal on a first control channel in a first cell, said first control channel having a first time base;
establishing a local clock reference, internal to said mobile terminal, capable of deriving said first time base;
operating said mobile terminal on a second traffic channel unsynchronized to said first control channel, said second traffic channel associated with said first cell;
updating said local clock reference based on said second traffic channel;
operating said mobile terminal on a first traffic channel unsynchronized to said first control channel after operating said mobile terminal on said second traffic channel, said first traffic channel associated with a second cell;
updating said local clock reference based on said first traffic channel;
determining a channel time offset representative of the timing difference between said first control channel and said first traffic channel;
receiving, at said mobile terminal, a TDMA-to-GPS relationship data representing the timing relationship between GPS time and said first time base;
providing a time estimate to said GPS receiver while said mobile terminal is operating on said first traffic channel, said time estimate based on said local clock reference, said channel offset, and said TDMA-to-GPS relationship data.

32. The method of claim 31 wherein receiving, by said mobile terminal, said TDMA-to-GPS relationship data comprises receiving, by said mobile terminal, a message on said first control channel containing said TDMA-to-GPS relationship data.

33. The method of claim 31 further comprising requesting, by said mobile terminal, said TDMA-to-GPS relationship data to be sent and wherein receiving, by said mobile terminal, said TDMA-to-GPS relationship data comprises receiving a message on said first traffic channel containing said TDMA-to-GPS relationship data.

34. The method of claim 31 further comprising recording, by said mobile terminal, a channel identification associated with said first control channel and requesting, by said mobile terminal, said TDMA-to-GPS relationship data via a message comprising said channel identification.

35. In a mobile terminal having a GPS receiver and operating in a wireless communications system, a method of determining a position of said mobile terminal, comprising:
operating said mobile terminal on a first control channel in a first cell, said first control channel having a first time base;
establishing a local clock reference, internal to said mobile terminal, capable of deriving said first time base;
recording, by said mobile terminal, a channel identification associated with said first control channel;
operating said mobile terminal on a first traffic channel unsynchronized to said first control channel after operating on said first control channel, said first traffic channel associated with a second cell;
updating said local clock reference based on said first traffic channel;
operating said mobile terminal on a second traffic channel unsynchronized to said first control channel prior to said operating said mobile terminal on said first traffic channel, said second traffic channel associated with said first cell;
updating said local clock reference based on said second traffic channel;
determining a channel time offset representative of the timing difference between said first control channel and said second traffic channel and thereafter updating said channel time offset to reflect the timing difference between said first control channel and said first traffic channel;
receiving, at said mobile terminal, a TDMA-to-GPS relationship data representing the timing relationship between GPS time and said first time base;
providing a time estimate to said GPS receiver while said mobile terminal is operating on said first traffic channel, said time estimate based on said local clock reference, said channel offset, and said TDMA-to-GPS relationship data;

determining a position of said mobile terminal using said GPS time estimate.

36. The method of claim 35 wherein receiving, by said mobile terminal, said TDMA-to-GPS relationship data comprises receiving, by said mobile terminal, a message on said first control channel containing said TDMA-to-GPS relationship data.

37. The method of claim 35 further comprising requesting, by said mobile terminal, said TDMA-to-GPS relationship data to be sent and wherein receiving, by said mobile terminal, said TDMA-to-GPS relationship data comprises receiving a message on said first traffic channel containing said TDMA-to-GPS relationship data.

38. The method of claim 35 further comprising said mobile terminal requesting said TDMA-to-GPS relationship data via a message comprising said channel identification.

39. The method of claim 35 further comprising:
   determining, remote from said mobile terminal, clock correction parameters indicative of the time drift between said first time base and GPS time; and
   supplying said clock correction parameters to said mobile terminal prior to said providing said time estimate to said GPS receiver;
   and wherein said time estimate is based on said local clock reference, said channel offset, and said TDMA-to-GPS relationship data, and said clock correction parameters.

40. A wireless communications mobile terminal, comprising:
   a communications receiver;
   a GPS receiver;
   a local clock reference, internal to said mobile terminal, capable of deriving a first time base associated with a first control channel in a first cell;
   TDMA-to-GPS relationship data representing the timing relationship between GPS time and said first time base stored in a local memory; said TDMA-to-GPS relationship data supplied to said mobile terminal via said communications receiver;
   a controller that communicates with said communications receiver and provides a GPS time estimate to said GPS receiver based on said local clock reference and said TDMA-to-GPS relationship data while said mobile terminal is operating on a first traffic channel unsynchronized to said first control channel;
   wherein said GPS receiver determines a position of said mobile terminal using said GPS time estimate.

41. The mobile terminal of claim 40 further including a channel identification associated with said first control channel stored in said memory.

42. The mobile terminal of claim 41 wherein said controller further requests said TDMA-to-GPS relationship data while said mobile terminal is operating on said first traffic channel via a message containing said channel identification.

* * * * *